Oct. 20, 1942.  H. A. S. HOWARTH  2,299,237
THRUST BEARING
Filed Aug. 4, 1940  4 Sheets-Sheet 3

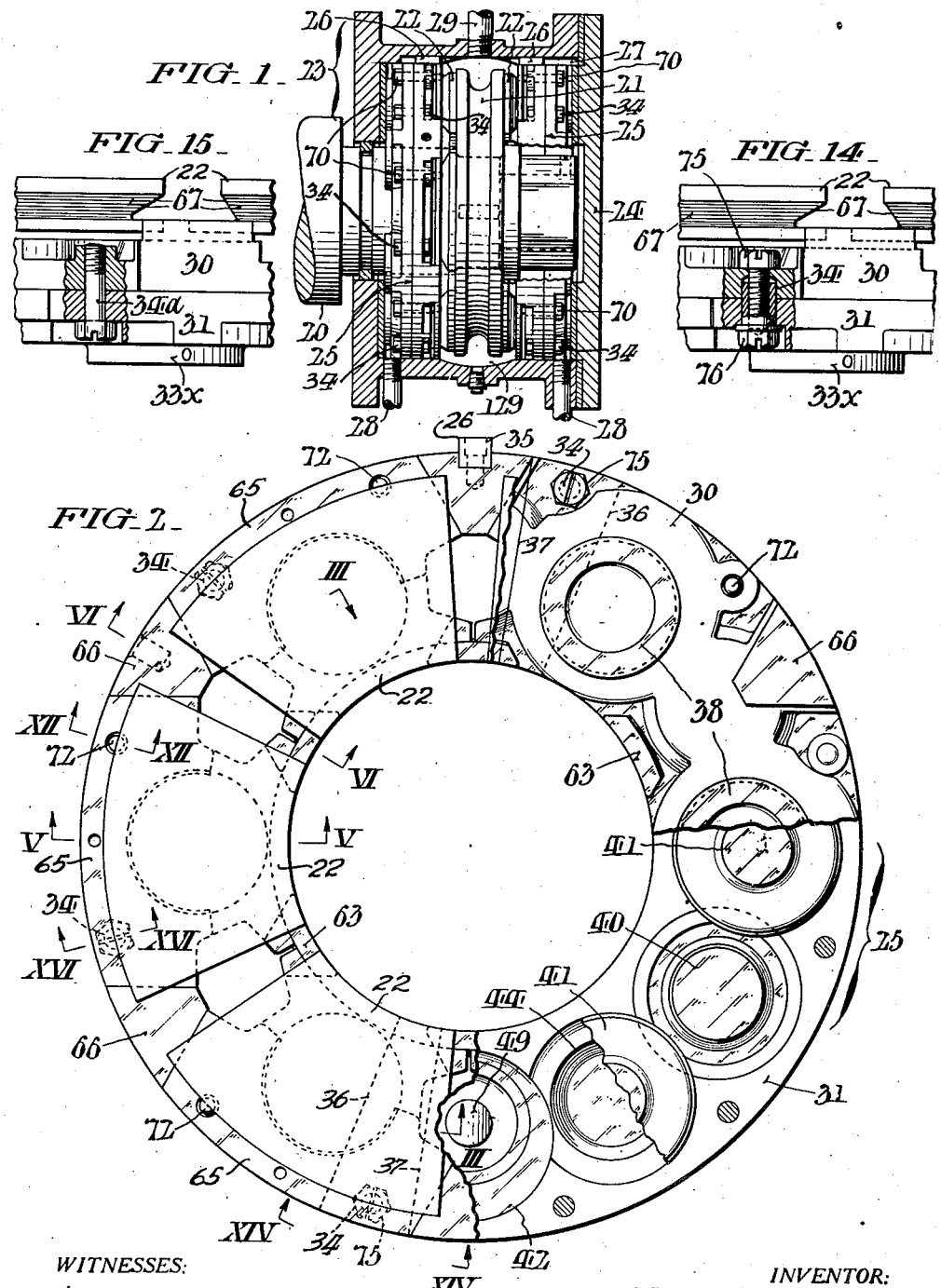

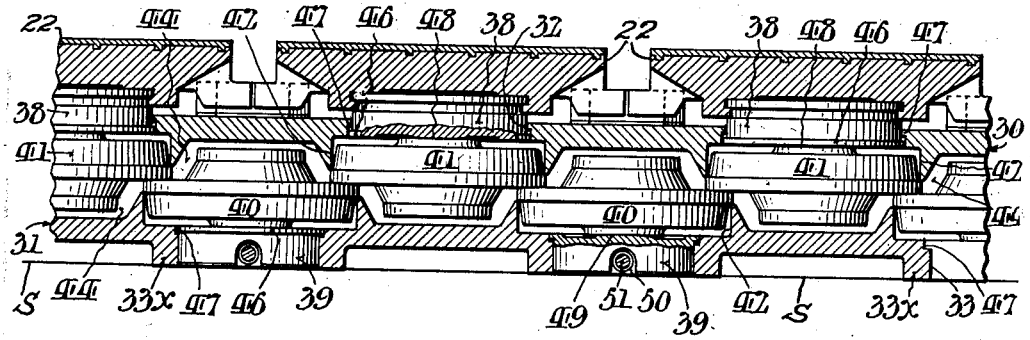
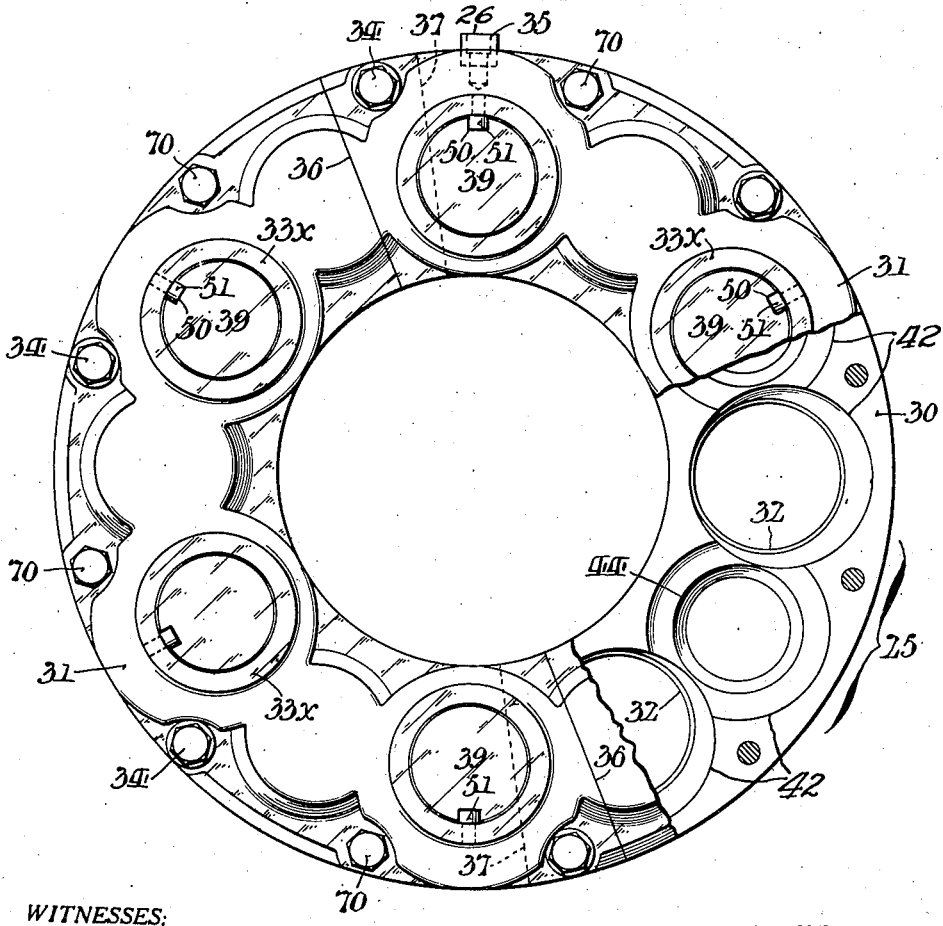

WITNESSES:
Woodrow Stewart
Thomas W. Kerr, Jr.

INVENTOR:
Harry A. S. Howarth,
BY Paul & Paul
ATTORNEYS.

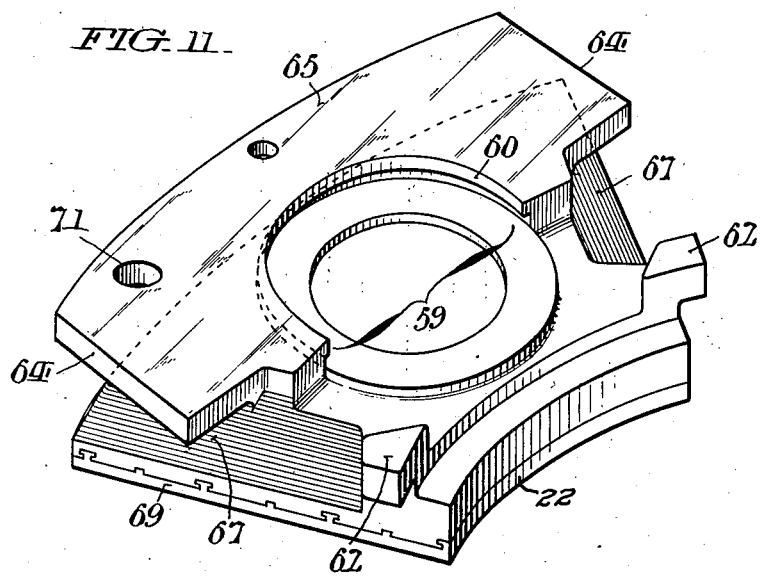
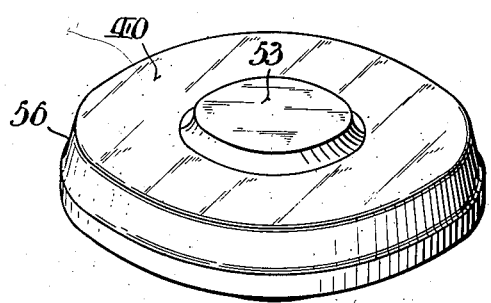
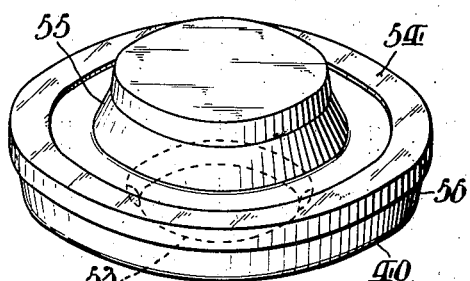
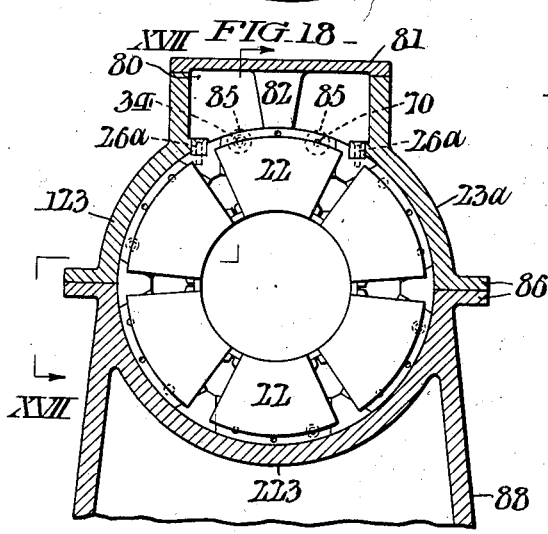
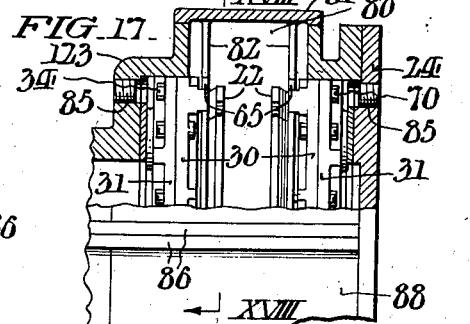

Patented Oct. 20, 1942

2,299,237

UNITED STATES PATENT OFFICE 2,299,237

THRUST BEARING

Harry A. S. Howarth, Philadelphia, Pa.

Application August 4, 1940, Serial No. 351,385

22 Claims. (Cl. 308—160)

This invention relates to thrust bearings, and especially to bearings employing a plurality of thrust bearing elements or shoes mounted to permit relative movement thereof in an axial direction, with provisions for proportioning or equalizing the thrust load among the several shoes. The thrust bearing shoes are generally arranged with freedom to tilt or rock circumferentially around the shaft or the bearing axis, and radially of the bearing too. Such bearings may be used with either a horizontal shaft or a vertical shaft. I aim to improve and simplify the construction of such bearings; to facilitate the assembly and taking apart of the bearing, including the removal and replacement of shoes when desired; and to make them very compact and relatively inexpensive to manufacture. The bearing here particularly illustrated and described is especially adaptable for high-speed turbine shafts that are subject to reversal of the thrust, as in marine work, and is accordingly shown with duplicate sets of oppositely acting bearing shoes, six to each set; but it will be understood that for thrusts that do not reverse a single set of shoes is sufficient, and that a greater or less number than six shoes may be used in a set.

Important features of the bearing hereinafter described are the combination of shoe-supporting and thrust equalizing and transmitting features for a set of shoes in a unified assembly that can be installed in the bearing or removed as a unit, and the removability of individual shoes without taking this assembly apart, or even without removing it from the bearing housing. For this purpose, the shoe-supporting and other parts are mounted in a frame structure consisting essentially of separated guide and retaining members or plates, with means for spacing apart and detachably securing them. In the present instance, the internal parts transmit the thrust to the ultimate support independently of the frame, which merely serves to guide the parts and keep them in proper position. Preferably, the frame structure may have the character of a casing sufficiently closed to exclude dirt from the parts within, and divided into annular halves. Each of such halves may be sub-divided into two or more segments, for convenience in installation and removal of the assembly.

The frame or casing halves (and their segments, if they are sub-divided) may be exact or substantial counterparts of one another, and may consist of castings made from the same pattern. Even when the frame or casing halves are somewhat different when finished, the differences in trimming and other machine work may be minimized by placing cores in the molds for the two halves so as to eliminate from each casting the metal which would provide the superfluous features. In the illustrated embodiment of the invention, openings through the lateral walls of the casing halves which accommodate shoe-supporting and thrust-transmitting parts are shown as machined to different sizes; but these openings and parts may be made of the same sizes, if preferred. In other respects, the casing halves are here illustrated as alike, and the internal parts associated with them are duplicates, thus considerably simplifying manufacture. All the loaded areas of contact and of tilting or pivoting between various parts of the assembly can be made with hardened metal surfaces, minimizing friction and wear.

Various other features and advantages of the invention will appear from the description of a species and form of embodiment, and from the drawings. All the features and combinations shown or described are of my invention, so far as novel.

In the drawings, Fig. 1 shows a vertical longitudinal section through the housing of a bearing conveniently embodying my invention, some of the internal parts being partly broken away to expose others to view. Fig. 2 is a top or front face view of a thrust bearing assembly such as shown in Fig. 1, turned 90° from its position in that figure. In the right-hand part of Fig. 2, the uppermost parts appearing in the left-hand part are omitted; while in the lower right-hand quadrant of the figure, the upper half of the casing and certain associated parts are omitted, and certain parts associated with the lower casing half are partly broken away. Fig. 3 is a developed sectional view through the bearing assembly, the section being taken as indicated by the line and arrows III—III in Fig. 2; and a line being added to indicate a supporting surface; Fig. 4 is a rear or bottom view of the bearing assembly shown in Fig. 2 with one casing half partly broken away, and certain associated parts omitted; and Figs. 5 and 6 are fragmentary views on a larger scale than Figs. 1-4, showing the assembly casing in section as indicated by the lines and arrows V—V and VI—VI in Fig. 2, with some of the internal parts partly broken away and in section.

Figs. 9 and 10 are tilted or perspective views of the opposite sides of the equalizers; and Fig. 11 is a tilted or perspective bottom view of a bearing shoe.

Figure 16:
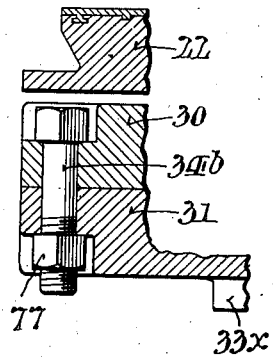
Figure 8:
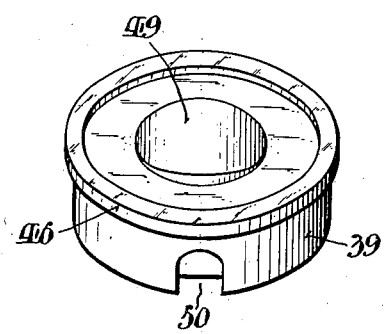
Figs. 7 and 8 are tilted or perspective views of the lower and upper faces of the top shoe-support and bottom fulcrum-support of the bearing assembly, (speaking with reference to Fig. 3)
Figure 7:
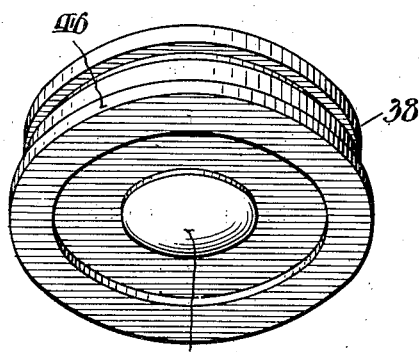

Fig. 14 is a fragmentary edge view of the bearing assembly taken as indicated by the line and arrows XIV—XIV in Fig. 2, certain parts being broken out and in section, illustrating one form of bolt for securing together the halves of the assembly casing; Fig. 15 is a similar fragmentary view illustrating another form of case bolt; and Fig. 16 is a fragmentary sectional view (the section taken as indicated by the line and arrows XVI—XVI in Fig. 2) showing still another form of case bolt.

Fig. 17 shows a partial vertical longitudinal section through a bearing housing somewhat different from that in Fig. 1, (the housing only being in section, taken substantially as indicated by the line and arrows XVII—XVII in Fig. 18) and illustrates another type of shoe retainer and certain provisions for access to other shoe retainers or to the case bolts, but omits the shaft and thrust collar; and Fig. 18 shows a vertical transverse section, taken as indicated by the line and arrows XVIII—XVIII in Fig. 17.

Fig. 1 of the drawings illustrates a thrust bearing arrangement especially suitable for a shaft 20 subject to heavy axial thrust in either direction, such as the shaft of a steam turbine. The shaft 20 is provided with a thrust collar 21, which may preferably be a separate part secured and keyed fast to the shaft. At each side of the thrust collar 21, there is a set of thrust bearing shoes 22 arranged around the shaft 20, and sustained against its end thrust by the end walls of the bearing housing 23, which is suitably supported and secured to take the thrust, by means not shown. While the right-hand end wall of the housing 23 may consist of a single detachable plate 24, the rest of the housing may preferably be divided into separate upper and lower halves, each including half of the circumferential housing wall or barrel and of the centrally apertured left-hand end wall as one integral casting, as illustrated in Figs. 17 and 18, and further explained hereinafter. The thrust on each set of shoes 22 is transmitted to the corresponding housing end through an interposed assembly of parts which (with the associated shoes 22) is generally and comprehensively designated 25. Rotation of the assemblies 25, 25 may be prevented by any suitable means, such as keys 26, 26 on these assemblies engaged in an internal longitudinal keyway or groove 27 in the circumferential wall of the housing 23, extending to its removable (right-hand) end wall 24. The housing 23 contains lubricant (oil) for lubricating the coacting faces of collar 21 and shoes 22; and the oil may be continually circulated through the bearing, being supplied to the housing through pipes 28, 28 adjacent the end walls, and being withdrawn through an intermediate pipe 29, opposite the periphery of the thrust collar 21. The bore of the housing 23 is shown enlarged into a wide, shallow circumferential channel 129 (of arcuate profile) around the thrust collar 21 and the outer edges of the two sets of bearing shoes 22.

The assemblies 25, 25 may be exactly alike, so that it will suffice to describe the one at the right in Fig. 1. This assembly 25 (with some of its thrust bearing shoes 22 omitted) is shown in Figs. 2 and 3 turned 90° from its position in Fig. 1—as if the shaft 20 were vertical—while Fig. 4 gives a back view of it. It will be convenient to refer to the parts as "upper" or "lower," etc., as they appear in Figs. 2 and 3, and as "reversed" in Fig. 4.

As shown in Figs. 2, 3, 5, and 6, the assembly 25 comprises a frame structure which consists essentially of upper and lower lateral guide and retaining members 30, 31 with means for spacing apart and detachably securing them,—to permit of inserting and removing various internal parts. Or, structurally, the members 30, 31 may be described as lateral walls having at their edges facial projections or flanges that abut on an intermediate (medial) plane of division. More specifically, the form of assembly frame here shown is a hollow casing of two annular trough-like halves, the upper half 30 with a series of equally spaced shoe-support openings 32 therethrough, and the lower half 31 with a series of fulcrum-support sockets 33 therein, also shown as openings through the lateral casing wall. External annular extensions or flanges 33x are shown on the bottom of the lower half 31 around its openings 33. The double annular series of equalizers 40, 41 are alternately accommodated and guided in the respective casing halves or frame sections 30, 31 in correspondence to their openings 32, 33 and interlocked with said sections against withdrawal or coming out through said openings. The casing halves 30, 31 are assembled and detachably secured together, as by bolts 34 (Figs. 1, 2, and 4), with their openings 32, 33 alternating or staggered. As here shown, the top casing half 30 carries the key 26 for the assembly 25, set into a longitudinal groove in this casing half and secured by a screw 35.

While each of the casing halves 30, 31 may be a one-piece ring, as suggested by Fig. 1, yet I prefer to divide or split each of these halves 30, 31 (diametrally) into semi-circular segments with radial abutting surfaces, and to offset the joints 36, 37 in the two halves circumferentially from one another, as indicated in Figs. 2 and 4,—preferably so that a bolt 34 intervenes between each two adjacent joints 36, 37 and secures to one another the segments of the two halves 30, 31 that lie at opposite sides of the bearing axis.

At or in the openings 32 of the upper wall 30 are supports 38 for the thrust bearing shoes 22, and at or in the sockets 33 of the lower wall 31 are fulcrum-supports 39 for the equalizers to be presently described. Preferably, the fulcrum-supports 39 are embodied in parts separate from the casing half 31. As shown in Fig. 3, there is a lower set of equalizers 40 fulcrumed on the supports 39, and an upper set of equalizers 41 on which the shoe-supports 38 are fulcrumed; and the equalizers of the different sets are arranged in alternation with their opposite edges overlapping and interengaged. This interlap of the equalizers 40, 41 may, of course, be varied, and need not be by any means so great as in Figs. 2, 3, and 4. Preferably, the shoe supports 38 and their openings 32, the fulcrum-supports 39 and their sockets 33, and the equalizers 40 and 41 are all circular, as shown. The casing halves 30, 31 may have (circular) guide sockets 42 for the equalizers 40, 41, radially aligned with their respective openings 32, 33, but displaced eccentrically outward. Between its equalizer sockets 42, the upper half 30 may have (circular) recesses or pockets 44 for the upper portions of the lower equalizers 41, and between its equalizer sockets 42 the lower half 31 may have (circular) recesses or pockets 44 for the lower portions of the upper equalizers 40. As will be seen from Figs. 2, 3, and 4, the sockets 42 and the recesses 44 of both halves 30, 31 "overlap" or open laterally into one another.

As shown in Figs. 3, 5, 6, 8, and 9, means of engagement are provided for preventing the shoe-supports 38 and the fulcrum-supports 39 from falling out (or being withdrawn) outward from their openings 32 and 33 in the casing halves 30, 31, such as external shoulders 46 on these supports 38 and 39, and rabbeted shoulders 47 formed in the inner surfaces of the casing halves around the openings 32, 33. For coacting with the equalizers 40 and 41, the supports 38 and 39 may be provided with rounded central fulcrum-bearing or support bosses 48, 49, shown as upstanding from the bottoms of depressions or countersinks in the lower and upper sides of the supports 38 and 39, respectively. The bosses 48 of the supports 38 are shown as spherically rounded, while the other support bosses 49 are cylindrically rounded about axes extending radially of the bearing, and means are provided to prevent turning of the supports 39 in their openings 33, such as interkeying notches and pins 50, 51 in the edges of the supports 39 and of the openings 33, Figs. 3, 4, and 6. The shoe-supports 38 are made loose enough in their openings 32 to allow them to rock or tip freely without risk of binding, and the fulcrum-supports 39 have sufficient clearance in their openings 33 to move up and down freely, and even to tip a little without binding. As shown in Fig. 3, the distance of their shoulders 46 above the bottoms of the fulcrum-supports 39 is decidedly greater than that of the casing shoulders 47 above the edges of its bottom flanges 33x on which the frame or casing of the assembly 25 rests, so that the supports 39 have substantial individual freedom of movement relative to the assembly frame or casing, and therefore bear on the sustaining surface or structure S quite independently of this frame or casing.

As shown in Fig. 2, the joints 36, 37 in the casing halves 30, 31 are so located that when the intervening bolts 34 are removed without disturbing any of the other bolts 34, the assembly 25 separates into two arcuate (semi-circular) parts each of which retains its shoes 22, supports 38, 39, and equalizers 40, 41 as against any possibility of their falling out: in other words, each such part is itself a self-subsistent unit in the same general way as is the whole assembly 25.

As shown in Figs. 2, 3, 4, 5, 9, and 10, the equalizers 40 and 41 are reversely arranged, but exactly alike; and they have flat bearing faces 53 (for coacting with the rounded bosses 48 and 49 of the parts 38 and 39) formed on central bosses at their fulcrum-engaging sides, while their other sides have narrow flat interengaging marginal zones 54, defined by annular depressions or countersinks around their central reduced body portions 55. The equalizers 40, 41 have sufficient clearance in their guide sockets 42 to allow them to rock or tip freely without binding; and to allow of minimum clearances for them, they are circumferentially reduced at 56 adjacent their fulcrum-engaging sides. The recesses 44 afford ample clearance for any possible normal movement of the conical equalizer portions 54.

As will be most readily apparent from Fig. 3, the freedom of the supports 39 and equalizers 40 and 41 to move up and down and to tilt or rock in their various guide openings or sockets 32 and 42, and the making of the fulcrum supports 39 as separate parts likewise free for vertical movement in their openings 33, all result in transmission of the thrust load on the bearing shoes 22 to the sustaining structure S (such as the end wall of the bearing housing 23) independently of the frame or casing structure of the assembly 25: i. e., this frame or casing merely serves to keep the loaded parts in proper relation to one another, without itself carrying any of the load. Thus the assembly 25 not only equalizes the load amongst the shoes 22 of a set, but compensates for surface irregularity or for warpage of the thrust-sustaining structures. In other words, the thrust is equalized both amongst the several shoes 22 and amongst the several supports 39, which may therefore be mounted on an unfinished rolled or cast plate with as good results as though it were machined or ground to the most perfect flatness.

The thrust bearing shoes 22 may be made as separate parts resting on the supports 38, and (preferably) detachably secured to them, so that the assembly 25 can be handled, installed in the housing 23, and removed therefrom as a unit, without the shoes having to be handled separately. Accordingly, the thrust bearing member consisting of each shoe 22 and its support 38 functions as one part as regards tilting for other movement in the operation or behavior of the bearing under load. As here shown (Figs. 2, 3, 5, 6, and 11), the attachment and disengagement is made by movement of the shoes 22 inward and outward, in a general radial direction with respect to the bearing, and is of a dovetail character: i. e., each support 38 has an undercut head 58 formed by an external groove therein, while the shoe 22 has in its back a semi-circular recess 59 open at one side, toward the axis of the bearing, to take the head 58, and undercut (by a groove at its bottom) to provide a ridge or flange 60 for engaging under the head 58.

Figure 6:
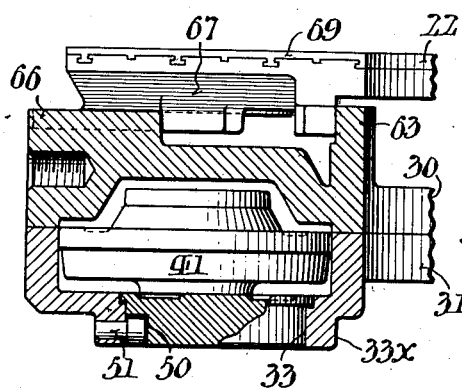
Figure 5:
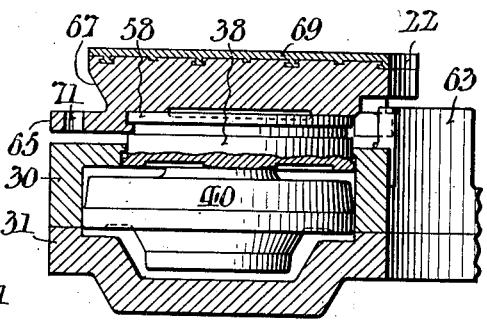

When thus keyed to the head 58, each shoe 22 may be held in proper angular relation thereto by engagement of (arcuate-faced) corner lugs 62 on its inner underneath portion against (arcuate) lugs 63 upstanding from the top of the upper casing half 30 at its inner periphery, as well as by engagement of end shoulders 64 on its outer underneath portion 65 between adjacent corresponding lugs 66, 66 (of approximately triangular outlines) upstanding from the casing half 30 at its outer periphery. As shown, the shoe shoulders 64 and the corresponding surfaces of the coacting lugs 66, 66 are parallel with one another and with a plane extending through the axis of the bearing and the center of the head 58; and when the shoe 22 is being put in place, the engagement of these parts guides its inward radial movement and causes proper seating of the support head 58 in the shoe recess 59. As shown in Figs. 1, 5, and 6, the rear shoe portion 65 is undercut by grooving 67 at the outer periphery and along the ends of the shoe 22, with the groove side sloping toward the active shoe face to facilitate proper flow of lubricant to the coacting faces of the shoe and the thrust collar 21. The acting faces of the shoes 22 may be surfaced with Babbitt or other suitable metal 69, as shown in Figs. 3, 5, 6, and 11.

Figure 12:
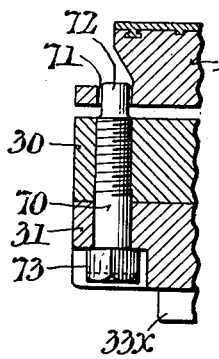
Fig. 12 is a fragmentary sectional view taken as indicated by the line and arrows XII—XII in Fig. 2, illustrating one form of shoe retainer.

Various means may be provided for securing or retaining the shoe 22 in interlocking engagement with the support 38 without interference with its desired rocking or tilting. The retainer shown in Figs. 2, 4, and 13 comprising a stop-and-guide "pin" 70 mounted in the casing structure of the assembly 25 for movement in the direction of the bearing axis, and engageably by such movement in a socket-hole 71 in the underneath shoe portion 65, near its outer corner. As shown in Fig. 12, this locking member 70 is in effect an ordinary screw-bolt threaded through the casing structure and reduced at its end 72 to have ample clearance in the hole 71. By backing the corresponding retainer 70 out of its socket 71 (by means of a socket-wrench, a spanner-wrench, or a screw-driver applied to its slotted polygonal actuating head 73), any shoe 22 can be released and removed from the bearing without otherwise taking apart the assembly 25, or even removing the latter from the bearing housing 23, Fig. 1.

Figure 13:
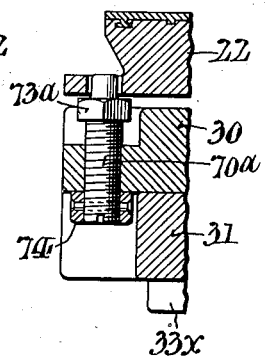
Fig. 13 is a similar fragmentary sectional view illustrating another form of shoe retainer.

Fig. 13 illustrates an alternative shoe retainer 70a, which differs from that in Fig. 12 in having its polygonal actuating "head" 73a at an intermediate point in its length, preferably between the rear shoe portion 65 and the top casing half 30, which is shown recessed to accommodate the head 73a and, on occasion, a wrench engaging it. The rear end of this retainer 70a has a stop-shoulder or head 74 formed by a nut or collar screwed on and secured by a diametral pin, and is also shown slotted to take a screw-driver. The head 74 is accommodated in a suitably deep recess or hole in the lower casing half 31. An advantage of this form of retainer 70a is that its range of possible axial movement is definitely limited both ways: by no possible maladjustment or accident can it be advanced so far as to interfere with the proper tilting of the shoe 22, or backed out of threaded engagement with the assembly 25 so as to get loose in the bearing housing 23 and cause trouble.

From Figs. 2, 3, 4, 5, 6 and the foregoing description of the assembly 25, it will be seen that the trough-like casing halves 30, 31 are substantially or exactly alike internally, and differ externally in that the lower half 31 lacks the upstanding lugs 63 and 66 of the upper half, while the upper half has nothing around its openings 32 that corresponds to the bottom flanges 33x of the lower half; furthermore, the openings 32, 33 in the two halves are shown as of different sizes. In manufacture, the housing halves 30, 31 can be cast from the same pattern, but trimmed and finished somewhat differently. The differences in the machine-work on the two casing halves 30, 31 may be minimized by placing cores in the mold for each half so as to eliminate from the casting made therein the metal which would be required to form the above-indicated features which the corresponding casing half need not finally possess. Substantial (if not exact) counterparts when finished, the two halves 30, 31 are not assembled with their homologous features directly opposite, but staggered, so that the large equalizer guide-sockets 42 of one are aligned with the smaller equalizer recesses or pockets 44 of the other.

The case bolts 34 shown in Figs. 1, 2, and 4, intermediate the joints 36, 37 of the casing halves 30, 31 may preferably be of the "dowel" type illustrated in Fig. 14, while the rest of these case bolts 34 may just as well be of the types illustrated in Figs. 15 and 16. Care should be taken to proportion the tap-bolt 75 in the upper casing half 30 and the dowel-nut 76 in the lower half 31 to the clearance existing above and below them, when the assembly 25 is in place in the housing 23, and to the thickness of metal through which the bolt extends, so that the bolt can readily be removed when it is desired to separate the parts of the assembly 25.

Fig. 15 illustrates another type of casing bolt that is suitable for use intermediate the joints 36, 37 of the casing halves 30, 31, as well as all around the assembly 25. This is a simple tap-bolt 34a (with slotted head) extending loose through the lower casing half 31 and threaded into the upper half 30. The length of this bolt 34a is so proportioned that even if it should unscrew completely, the available clearance will not allow it to come out of its hole.

Fig. 16 illustrates a type of casing bolt which may be used anywhere around an assembly 25 whose casing halves 30, 31 are unbroken rings as shown in Fig. 1, but is not as suitable as those in Figs. 14 and 15 for use intermediate the joints 36, 37 of casing halves 30, 31 that are split. This is an ordinary screw bolt 34b extending down through the casing halves 30, 31, with its nut 77 applied from beneath against the lower casing half 31.

Figs. 17 and 18 illustrate a modified bearing housing 23a, as well as modifications in its relations to the assemblies 25, 25, therein, and in other features. As here shown, the assemblies 25, 25 are so placed in the housing 23a that two of the bearing shoes 22, 22 lie at the very top of the bearing, and the housing 23a has a flanged top opening 80 which is somewhat wider transversely than these bearing shoes 22, 22. The assemblies 25, 25 have pairs of keys 26a, 26a that engage against the sides of the opening 80 to keep the assemblies from turning. The detachable cover 81 for the opening 80 carries downward-projecting shoe-retainer arms or lugs 82 whose ends engage snugly against the outer edges of the rear portions 65, 65 of the top shoes 22, 22, thus preventing outward shifting of these shoes to disengage them from the support heads 58, 58 (not shown in Figs. 17 and 18). Shoe retainers such as shown in Fig. 12 (or in Fig. 13) may or may not be provided. In the absence of such shoe retainers, removal of the cover 81 at once frees the top shoes 22, 22 for removal and inspection (by lifting them out through the opening 80), without any necessity for removing the top half of the housing 23a. This allows the general condition of two sets of bearing shoes to be very easily determined, since experience has shown that the condition of a single shoe of an equalized set is a reliable indication as to the other shoes of the set.

Figs. 17 and 18 also illustrate convenient arrangements for access to shoe-retainers 70 or to case-bolts 34 when it is desired to release a shoe 22 as above described, or to detach segments of assembly halves 30, 31 for removal from the housing 23a without removing shaft 20 with its thrust collar 21. As here shown, there are access openings 85 in the end walls of the housing 23a through which the retainer 70 of the uppermost shoe 22 and the topmost case-bolt 34 can be rotated and unscrewed (or screwed up again) with a socket-wrench or a screw-driver. Even when there are only the two topmost openings 85, 85 shown in Fig. 18, access to all the shoe retainers and case bolts can be had by turning the assemblies 25 in the housing 23a after removing their keys 26a. Of course it will be understood that any of the shoe retainers and case bolts illustrated in Figs. 12, 13, 14, and 15, may be operated through access openings 85 in the manner above indicated.

As already mentioned in connection with Fig. 1, Figs. 17 and 18 show the housing 23a as divided into separate upper and lower parts 123 and 223, each including half of the left-hand end wall and of the barrel of the housing. These parts 123, 223 are shown as provided with bolting flanges 86, 86 for securing them together, and the lower part 223 is shown as including a pedestal portion 88.

Referring now especially to Figs. 1, 2, 4, and 11, it will be seen that lubricant entering the casing 23 at its opposite ends through the pipes 28, 28 is prevented by the peripheral fit of the assemblies 25, 25 against the circumferential casing wall from passing directly to the middle of the casing, but has relatively free passage inward between the backs of the assemblies 25, 25 and the casing ends 23, the annular projections 33x serving as spacers for this purpose. Reaching the periphery of the shaft 20, the oil has free passage around it through the inner peripheries of the assemblies 25, 25 to the front faces of these assemblies. Thereafter, it has relatively free outward passage across these assembly faces, between their arcuate lugs 63, around the supports 38 and the lugs 66, and between and behind the active front portions of the bearing shoes 22 and in the edge grooves 67 of adjacent shoe ends, all with relatively little impact or friction, owing to the slope or curvature of all the surfaces on the assemblies 25, 25 with which it comes in contact. At the same time, the outflowing oil has excellent opportunuity to work in between the coacting faces of the thrust collar 21 and the shoes 22.

Passing outward beyond the shoes 22, the oil reaches a large circumferential channel around them and the grooved periphery of the thrust collar 21, which channel is made more ample by the annular enlargement of the housing 23 around these parts at 129. In this ample channel between the stationary housing and the rapidly moving periphery of the thrust collar 21, the oil flows around to the outlet pipe 29 in a relatively thick stream, so that the distortion or shear and the friction in the oil is relatively low. Thus wastage of power in the oil-filled bearing is minimized without resort to measures which might result in aeration or foaming of the oil in the bearing housing 23.

In Figs. 13, 15 and 16, 17 and 18, various parts and features are marked with the same reference numerals as are applied to corresponding parts and features in Figs. 12, 14 and 1, as a means of dispensing with repetitive description,—a distinctive letter being added where differences in the parts themselves make such distinction desirable.

Having thus described my invention, I claim:

1. A thrust bearing unit assembly comprising an annular frame structure having opposed lateral walls, with a series of support openings in one of said walls and a series of supporting fulcrums associated with the other of said walls, the openings and fulcrums of the respective lateral walls being staggered around said frame structure; a double series of tilting equalizers extending around the bearing between said lateral walls and successively interlapping and interengaged, at opposite sides of one another alternately, alternate equalizers being fulcrumed on the aforesaid fulcrums; tilting thrust bearing shoe supports movable under bearing thrusts in the openings of the apertured lateral wall and interlocking therewith against outward withdrawal, and also pivoted on the other alternate equalizers; and thrust bearing shoes outside said last-mentioned lateral wall carried by said thrust-shoe supports.

2. A thrust bearing unit assembly comprising an annular frame structure having opposed lateral walls, with a series of circular support openings in each of said walls, the openings in the respective lateral walls being staggered around said structure; a double series of tilting equalizers extending around the bearing between said lateral walls and successively interlapping and interengaged, at opposite sides of one another alternately; thrust-transmitting fulcrum-supsupports for alternate equalizers engaged with capacity for free movement under bearing thrusts in the openings of one of the aforesaid lateral walls; tilting thrust bearing shoe supports movable under bearing thrusts in the openings of the other lateral wall aforesaid and also pivoted on the other alternate equalizers; and thrust bearing shoes outside said last-mentioned lateral wall carried by said thrust-shoe supports.

3. A thrust bearing unit assembly comprising an annular frame structure having opposed lateral walls, with a series of support openings in each of said walls, the openings in the respective lateral walls being staggered around said structure; a double series of tilting equalizers extending around the bearing between said lateral walls and successively interlapping and interengaged, at opposite sides of one another alternately, thrust-transmitting fulcrum-supports for alternate equalizers movable under bearing thrusts in the openings of one of the aforesaid lateral walls and interlocking therewith against outward withdrawal; tilting thrust bearing shoe supports movable under bearing thrusts in the openings of the other lateral wall aforesaid and interlocking therewith against outward withdrawal, and pivoted on the other alternate equalizers; and thrust bearing shoes outside said last-mentioned lateral wall detachably secured to said thrust-shoe supports.

4. A thrust bearing unit assembly comprising an annular frame structure having opposed lateral walls, with a series of circular support openings in each of said walls, the openings in the respective lateral walls being staggered around said structure; a double series of circular tilting equalizers extending around the bearing between said lateral walls and successively interlapping and interengaged, at opposite sides of one another alternately; circular thrust-transmitting fulcrum supports for alternate equalizers movable under bearing thrusts in the openings of one of the aforesaid lateral walls and interlocking therewith against outward withdrawal, and also secured thereto aginst turning in the openings; and circular tilting thrust bearing shoe supports movable under bearing thrusts in the openings of the other lateral wall aforesaid and interlocking therewith against outward withdrawal, and pivoted on the other alternate equalizers.

5. In a thrust bearing, the combination of an annular frame structure having opposed lateral walls, with a series of support openings in one of said walls and a series of supporting fulcrums associated with the other of said walls, the openings and fulcrums of the respective lateral walls being staggered around said frame structure; a double series of tilting equalizers extending around the bearing between said lateral walls and successively interlapping and interengaged, at opposite sides of one another alternately, alternate equalizers being fulcrumed on the aforesaid fulcrums; tilting thrust bearing shoe supports movable under bearing thrusts in the openings of the apertured lateral wall and interlocking therewith against outward withdrawal, and also pivoted on the other alternate equalizers and provided with undercut heads; thrust bearing shoes outside said last-mentioned lateral wall having undercut sockets interlockingly engageable with the heads of said thrust-shoe supports, but releasable from them by displacement radially of the bearing; and retainer means for preventing such displacement of said thrust bearing shoes while leaving them free to tilt.

6. A thrust bearing unit assembly comprising an annular frame structure having opposed lateral walls, with a series of circular support openings in one of said walls and a series of supporting fulcrums associated with the other of said walls, the openings and fulcrums of the respective lateral walls being staggered around said frame structure; a double series of tilting equalizers extending around the bearing between said lateral walls and successively interlapping and interengaged, at opposite sides of one another alternately, alternate equalizers being fulcrumed on the aforesaid fulcrums; tilting thrust bearing shoe supports movable under bearing thrusts in the openings of the apertured lateral wall and interlocking therewith against outward withdrawal, and pivoted on the other alternate equalizers; thrust bearing shoes outside said last-mentioned lateral wall detachably secured to said thrust-shoe supports, but releasable from them by displacement radially of the bearing, and having retainer sockets presented toward said frame structure; and retainer members, for preventing such displacement of said thrust bearing shoes while leaving them free to tilt, mounted on said frame structure for movement axially of the bearing into and out of said retainer sockets.

7. A thrust bearing unit assembly comprising an annular frame structure having opposed lateral walls, with a series of support openings in each of said walls, the openings in the respective lateral walls being staggered around said structure; a double series of tilting equalizers extending around the bearing between said lateral walls and successively interlapping and interengaged, at opposite sides of one another alternately; thrust-transmitting fulcrum-supports for alternate equalizers movable under bearing thrusts in the openings of one of the aforesaid lateral walls and interlocking therewith against outward withdrawal; tilting thrust bearing shoe supports movable under bearing thrusts in the openings of the other lateral wall aforesaid and interlocking therewith against outward withdrawal, and pivoted on the other alternate equalizers and provided with undercut heads; thrust bearing shoes outside said last-mentioned lateral wall having undercut sockets interlockingly engageable with the heads of said thrust-shoe supports, but releasable from them by displacement radially of the bearing and having retainer sockets presented toward said frame structure; and retainer screws, for preventing such displacement of said thrust bearing shoes while leaving them free to tilt, mounted on said frame structure for movement axially of the bearing into and out of said retainer sockets.

8. A thrust bearing unit assembly comprising a hollow annular casing structure having opposed lateral walls, with a series of support openings in one of said walls and a series of supporting fulcrums associated with the other of said walls, the openings and fulcrums of the respective lateral walls being staggered around said annular structure, and said structure being divided between said lateral walls into superposed annular sections; a double series of tilting equalizers extending around the bearing between said lateral walls and successively interlapping and interengaged, at opposite sides of one another alternately, alternate equalizers being fulcrumed on the aforesaid fulcrums; tilting thrust bearing shoe supports movable under bearing thrusts in the openings of the apertured lateral wall aforesaid and pivoted on the other alternate equalizers; thrust bearing shoes detachably secured to said thrust-shoe supports, but releasable from them by displacement radially of the bearing; and retainer means, for preventing such displacement of said thrust bearing shoes while leaving them free to tilt, mounted on the first mentioned structure for movement axially of the bearing into and out of engagement with said thrust bearing shoes.

9. A thrust bearing unit assembly comprising a hollow annular casing structure having opposed lateral walls, with a series of support openings in each of said walls, the openings in the respective lateral walls being staggered around said annular structure, and said structure being divided between said lateral walls into superposed annular sections; a double series of tilting equalizers extending around the bearing between said lateral walls and successively interlapping and interengaged, at opposite sides of one another alternately; thrust-transmitting fulcrum-supports for alternate equalizers engaged with capacity for free movement under bearing thrusts in the openings of one of the aforesaid lateral walls; tilting thrust bearing shoe supports movable under bearing thrusts in the openings of the other lateral wall aforesaid and pivoted on the other alternate equalizers; and thrust bearing shoes outside said last-mentioned lateral wall carried by said thrust shoe supports.

10. A thrust bearing unit assembly comprising a hollow annular casing structure having opposed lateral walls, with a series of support openings in one of said walls and a series of supporting fulcrums associated with the other of said walls, the openings and fulcrums of the respective lateral walls being staggered around said annular structure, and said structure being divided between said lateral walls into superposed annular trough-like sections; a double series of tilting equalizers extending around the bearing between said lateral walls and successively interlapping and interengaged, at opposite sides of one another alternately, alternate equalizers being fulcrumed on the aforesaid fulcrum supports; tilting thrust bearing shoe supports movable under bearing thrusts in the openings of the apertured lateral wall aforesaid and interlocking therewith against outward withdrawal, and pivoted on the other alternate equalizers; thrust bearing shoes outside said last-mentioned lateral wall detachably secured to said thrust-shoe supports, but releasable from them by displacement radially of the bearing and having retainer sockets presented toward said casing structure; and retainer means, for preventing such displacement of said thrust bearing shoes while leaving them free to tilt, mounted on the first mentioned structure for movement axially of the bearing into and out of said retainer sockets.

11. A thrust bearing unit assembly comprising a hollow annular casing structure having opposed lateral walls, with a series of circular support openings in each of said walls, the openings in the respective lateral walls being staggered around said annular structure, and said structure being divided between its said lateral walls into superposed annular sections; a double series of circular tilting equalizers extending around the bearing between said lateral walls and successively interlapping and interengaged, at opposite sides of one another alternately; circular thrust-transmitting fulcrum supports for alternate equalizers movable under bearing thrusts in the openings of one of the aforesaid lateral walls and interlocking therewith against outward withdrawal; and circular tilting thrust bearing shoe supports movable under bearing thrusts in the openings of the other lateral wall aforesaid and interlocking therewith against outward withdrawal, and pivoted on the other alternate equalizers.

12. A thrust bearing unit assembly comprising a hollow annular casing structure having opposed lateral walls, with a series of circular support openings in one of said walls and a series of supporting fulcrums associated with the other of said walls, the openings and fulcrums of the respective lateral walls being staggered around said annular structure, and said structure being divided between its said lateral walls into superposed annular sections, and each of the sections also divided into segments overlapping circumferentially with the segments of the other section; a double series of tilting equalizers extending around the bearing between said lateral walls and successively interlapping and interengaged, at opposite sides of one another alternately, alternate equalizers being fulcrumed on the aforesaid fulcrum supports; and tilting thrust bearing shoe supports movable under bearing thrusts in the openings of the other lateral wall aforesaid and interlocking therewith against outward withdrawal, and also pivoted on the other alternate equalizers.

13. A thrust bearing unit assembly comprising a hollow annular casing structure having opposed lateral walls, with a series of circular support openings in each of said walls, the openings in the respective lateral walls being staggered around said annular structure, and said structure being divided between said lateral walls into superposed annular sections, each with a series of equalizer chambers therein in positions circumferentially corresponding to those of its support openings; a double series of circular tilting equalizers extending around the bearing in said equalizer chambers and successively interlapping and interengaged, at opposite sides of one another alternately; circular thrust-transmitting fulcrum supports for alternate equalizers movable under bearing thrusts in the openings of one of the aforesaid lateral walls and interlocking therewith against outward withdrawal; and circular tilting thrust bearing shoe supports movable under bearing thrust in the openings of the other lateral wall aforesaid and interlocking therewith against outward withdrawal, and also pivoted on the other alternate equalizers.

14. A thrust bearing unit assembly frame comprising a hollow annular structure having opposed lateral walls, with a series of circular support openings in each of said walls, the openings in the respective lateral walls being staggered around said annular structure and said structure being divided between its said lateral walls into superposed annular sections, and each of the sections being also divided into segments overlapping circumferentially with the segments of the other section, the divisions of the segments being out of alignment with the centers of said support openings.

15. A thrust bearing unit assembly frame comprising a hollow annular casing structure having opposed lateral walls, with a series of circular support openings in each of said walls, the openings in the respective lateral walls being staggered around said structure, and said annular structure being divided between its said lateral walls into superposed annular sections, each with a series of equalizer chambers therein in positions circumferentially corresponding to those of its support openings.

16. A thrust bearing comprising a unit assembly including an annular frame structure having opposed lateral walls, with a series of openings in each of them, the openings in the respective lateral walls being staggered around said structure, and a double series of tilting equalizers, alternately corresponding to the openings in the respective lateral walls, extending around the bearing between said walls and interlocking with the walls against withdrawal, said equalizers successively interlapping and interengaging at opposite sides of one another in alternation; thrust bearing members at one side of said annular frame structure tiltably supported by alternate equalizers through the corresponding lateral wall openings; and means at the other side of said annular frame structure affording fulcrum support for the other alternate equalizers independently of said frame structure, through the openings of its other lateral wall.

17. A thrust bearing comprising a unit assembly including an annular frame structure having opposed lateral walls, with a series of openings in each of them, and divided between said walls into superposed annular sections, the wall openings of the respective sections being staggered around said structure, and a double annular series of tilting equalizers alternately accommodated and guided in the respective sections in correspondence to their said openings, but interlocking with said sections against withdrawal, said equalizers successively interlapping and interengaging at opposite sides of one another in alternation; thrust bearing members at one side of said annular frame structure tiltably supported by alternate equalizers through the corresponding lateral wall openings; and means at the other side of said annular frame structure affording fulcrum support for the other alternate equalizers independently of said frame structure, through the openings of its other lateral wall.

18. A thrust bearing unit assembly comprising an annular frame structure with a system of equalizers therein; a series of thrust bearing shoes outside said frame structure, and thrust supports for said shoes mounted in said frame structure and interlocking therewith against withdrawal, and sustained by said equalizer system; and a series of fulcrum supports for said equalizer system mounted in said frame structure and projecting therefrom, and movable relative to the frame structure under bearing thrusts, but interlocking with said frame structure against withdrawal; so that the bearing thrusts are transmitted by the fulcrum supports directly to any sustaining structure with which the unit assembly may be associated, independently of said frame structure.

19. A thrust bearing unit assembly comprising an anular frame structure with a system of equalizers therein; a series of thrust bearing shoe supports mounted in said frame structure and interlocking therewith against withdrawal, and sustained by said equalizer system; and a series of fulcrum supports for said equalizer system mounted in said frame structure and projecting therefrom, and movable relative to the frame structure under bearing thrusts, but interlocking with the frame structure against withdrawal.

20. A thrust bearing unit assembly comprising an annular frame structure with a system of equalizers therein, and a series of supporting fulcra for said equalizer system; a series of thrust bearing shoe supports mounted in said frame structure and interlocking therewith against withdrawal, and sustained by said equalizer system; and a series of thrust bearing shoes outside said frame structure detachably secured to said thrust bearing shoe supports.

21. A thrust bearing unit assembly comprising an annular frame structure with a system of equalizers therein, and a series of supporting fulcra for said equalizer system; a series of tilting thrust bearing shoe supports mounted in said frame structure and interlocking therewith against withdrawal, and sustained by said equalizer system; a series of thrust bearing shoes detachably secured to said thrust bearing shoe supports, but releasable from them by displacement radially of the bearing; and retainer means for preventing such displacement of said thrust bearing shoes, while leaving them free to tilt.

22. A thrust bearing unit assembly comprising an annular frame structure with a system of equalizers therein, and a series of supporting fulcra for said equalizer system; a series of thrust bearing shoe supports mounted in said frame structure and interlocking therewith against withdrawal, and sustained by said equalizer system, and also provided with undercut interlocking means; a series of thrust bearing shoes having undercut interlocking means for engaging with those of said thrust bearing shoe supports, but releasable from them by displacement radially of the bearing, and having retainer sockets presented toward said frame structure; and retainer means mounted on said frame structure for movement axially of the bearing into and out of said retainer sockets.

HARRY A. S. HOWARTH.